(12) United States Patent
Frederiksen et al.

(10) Patent No.: US 11,137,482 B2
(45) Date of Patent: Oct. 5, 2021

(54) LIDAR DEVICE HAVING INCREASED TRANSMISSION POWER WHILE TAKING EYE SAFETY INTO CONSIDERATION, AND METHOD FOR SCANNING A REGION TO BE SCANNED

(71) Applicant: Robert Bosch GmbH, Stuttgart (DE)

(72) Inventors: Annette Frederiksen, Renningen (DE); Nico Heussner, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/625,878

(22) PCT Filed: May 30, 2018

(86) PCT No.: PCT/EP2018/064132
§ 371 (c)(1),
(2) Date: Dec. 23, 2019

(87) PCT Pub. No.: WO2019/001880
PCT Pub. Date: Jan. 3, 2019

(65) Prior Publication Data
US 2020/0150245 A1    May 14, 2020

(30) Foreign Application Priority Data
Jun. 26, 2017  (DE) .......................... 102017210680.8

(51) Int. Cl.
*G01S 7/481* (2006.01)
*G01S 17/89* (2020.01)
(52) U.S. Cl.
CPC ............ *G01S 7/4817* (2013.01); *G01S 17/89* (2013.01)

(58) Field of Classification Search
CPC ...... G01S 7/4815; G01S 7/4817; G01S 17/42; G01S 17/89
See application file for complete search history.

(56) References Cited

U.S. PATENT DOCUMENTS

| 9,671,094 B2* | 6/2017 | Ball ..................... G01C 11/025 |
| 2006/0145062 A1* | 7/2006 | Boehlau ................ G01S 7/4817 |
| | | 250/221 |

(Continued)

FOREIGN PATENT DOCUMENTS

| DE | 19927501 A1 | 11/2000 |
| DE | 10244641 A1 | 4/2004 |
| DE | 102015101722 A1 | 8/2015 |

OTHER PUBLICATIONS

English translation of DE19927501. Attained from ESPACENET on Feb. 1, 2021. (Year: 2021).*

(Continued)

*Primary Examiner* — Michael A Lyons
(74) *Attorney, Agent, or Firm* — Norton Rose Fulbright US LLP; Gerard Messina

(57) ABSTRACT

A lidar device is described for scanning a region to be scanned, using at least one beam. The device includes at least one radiation source for generating the at least one beam, as well as a receiving unit for receiving at least one beam reflected by an object and for deflecting the at least one reflected beam onto a detector. The at least one radiation source generates the at least one beam away from an axis of symmetry, and the at least one beam traveling at a distance from the axis of symmetry. A method for scanning a region to be scanned is also described.

10 Claims, 4 Drawing Sheets

(56) References Cited

U.S. PATENT DOCUMENTS

| 2015/0219764 A1* | 8/2015 | Lipson ................... G01S 17/89 |
| | | 356/4.01 |
| 2018/0059221 A1* | 3/2018 | Slobodyanyuk ...... G01S 7/4814 |
| 2018/0081032 A1* | 3/2018 | Torruellas ............... G01S 17/42 |

OTHER PUBLICATIONS

International Search Report for PCT/EP2018/064132, dated Aug. 16, 2018.

* cited by examiner

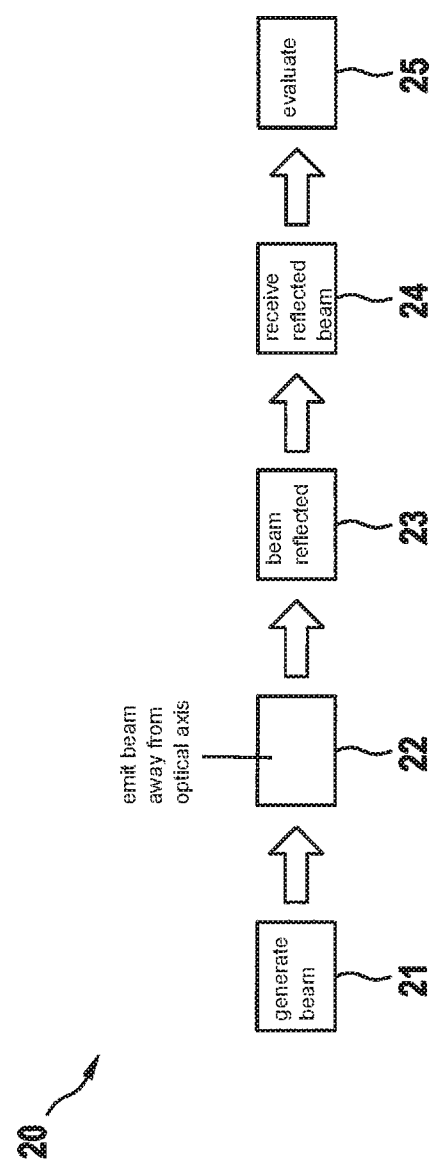

LIDAR DEVICE HAVING INCREASED TRANSMISSION POWER WHILE TAKING EYE SAFETY INTO CONSIDERATION, AND METHOD FOR SCANNING A REGION TO BE SCANNED

FIELD

The present invention relates to a lidar device for scanning a region to be scanned, using at least one beam, as well as to a method for scanning the region to be scanned, using at least one beam.

BACKGROUND INFORMATION

Customary lidar (light detection and ranging) devices are made up of a transmitting device and a receiving device. The transmitting device generates and emits electromagnetic beams continuously or in a pulsed manner. If these beams strike a moving or stationary object, the beams are reflected by the object in the direction of the receiving device. The receiving device may detect the reflected electromagnetic radiation and assign the reflected beams a time of receipt. This may be used, for example, within the scope of a time of flight analysis for ascertaining a distance of the object from the lidar device. Lasers are often used as radiation sources, which must be classified in accordance with the IEC 60825-1 standard. Regarding eye safety, in the case of infrared lasers, only the limiting values for transmission powers of laser class 1 are regarded as safe. This is particularly problematic in applications of lidar devices, which require a large range. The maximum range of a lidar device may be regarded as proportional to the transmission power.

SUMMARY

An object of the present invention is to provide a method and a lidar device, which renders a higher transmission power possible while taking eye safety into account.

This object may be achieved in accordance with the present invention. Advantageous refinements of the present invention are described herein.

According to one aspect of the present invention, a lidar device for scanning a region to be scanned, using at least one beam, is provided. The lidar device includes at least one radiation source for generating the at least one beam. A receiving unit is used for receiving at least one beam reflected by an object and for deflecting the at least one reflected beam onto a detector. According to the present invention, the at least one radiation source generates the at least one beam at a distance from an axis of symmetry of the lidar device; the at least one beam traveling at a distance from the axis of symmetry.

An important parameter for eye safety is expansion of the apparent source, that is, of the generated beam, in the form of a spot size produced on the retina of an eye. The greater this expansion is, the higher a transmission power of the radiation source may be selected to be, since the generated beam may be imaged on a greater area on the retina. In taking eye safety into account, an accommodation for the eye must be included in the deliberations. The accommodation for the eye may result in different images of the generated beams on the retina. In this connection, a focal range of the eye between 10 cm and infinity may be assumed. A focusing adjustment of the eye to 10 cm corresponds to a focal length of the eye of 14.5 cm, converted to air; when accommodating the eye to infinity, the focal length of the eye is 17 mm. The at least one beam generated has an optical path, which does not intersect the axis of symmetry of the lidar device and is produced to be set apart from the axis of symmetry. Consequently, the at least one radiation source is positioned off-axis. In this manner, the lidar device may be prevented from acting as a virtual point source. The axis of symmetry may be positioned as desired, as a function of the design of the lidar device.

In particular, the axis of symmetry may be positioned parallelly to a propagation direction of the at least one beam or orthogonally to the propagation direction of the at least one beam. For example, the axis of symmetry may be an axis of rotation or may run through a center of gravity of the lidar device. Alternatively, the axis of symmetry may also run orthogonally to an optical axis or be coincident with an optical axis. In contrast to an off-axis set-up, in the case of an on-axis set-up of a lidar device, in which the radiation source is situated, for example, in the center of a rotor, the generated beams travel through an optical axis or the axis of symmetry at all times. Through this, there is a distance of the eye from the lidar device, at which the generated beams may be imaged on the same spot of the retina, in particular, due to the intersection of a plurality of beams. This results in markedly greater danger to the retina than in the case of an off-axis set-up of at least one radiation source in accordance with the present invention. By preventing points of intersection, a transmission power of the at least one radiation source may be increased without jeopardizing eye safety. In addition, an improved signal-to-noise ratio and a higher range of the lidar device may result from the higher transmission power.

According to one exemplary embodiment of the lidar device, a plurality of radiation sources are positioned in parallel to each other. The specific radiation sources are preferably set apart from each other. Due to a parallel set-up of the radiation sources, the beams generated by the radiation sources have optical paths running parallelly to each other. Due to this, there are no common spectral overlap points of the beams. Such spectral overlap points may be regarded as a "worst-case" scenario; the sum of the transmission power of all radiation sources not being allowed to exceed certain limiting values, in order to ensure eye safety. Since there are no intersection points in the lidar device, each radiation source may have a maximum transmission power in accordance with the limiting value.

According to a further exemplary embodiment of the lidar device according to the present invention, the at least one radiation source is positioned on a rotor. Therefore, the at least one radiation source may be swiveled by the rotor along at least a horizontal scanning angle. It is advantageous that the at least one radiation source may also be swiveled along a vertical scanning angle. The horizontal scanning angle and the vertical scanning angle may span the region to be scanned.

According to a further exemplary embodiment of the lidar device according to the present invention, an axis of rotation of the rotor intersects the axis of symmetry of the lidar device or is coincident with the axis of symmetry. Depending on a design of the lidar device, the axis of rotation may be an axis of symmetry. For example, the axis of symmetry may form a point of intersection with the axis of rotation or with at least one optical axis of the lidar device. Alternatively, the optical axis may be defined as a central axis of symmetry oriented orthogonally to the axis of rotation of the rotor. This allows the lidar device to be constructed symmetrically and, therefore, to be manufactured in a technically simple manner.

According to a further exemplary embodiment of the lidar device according to the present invention, the at least one radiation source is stationary-mounted. Alternatively, or in addition, the at least one radiation source may be situated outside of a rotor. For example, the lidar device may be constructed as a non-rotating and/or a flash lidar device. In this case, as well, a point of intersection of the beams may be prevented as a function of the positioning of the radiation sources. Such a lidar device does not have any moving components, and consequently, it may be operated with a low rate of wear. In the case of a flash lidar device, the axis of symmetry may run, for example, through a midpoint between two radiation sources or through a midpoint between a plurality of symmetrically or asymmetrically distributed radiation sources. Depending on the specific embodiment, emission surfaces of the radiation sources may span or define a surface, through which the axis of symmetry may run orthogonally as, for example, a surface normal.

According to a further exemplary embodiment of the lidar device according to the present invention, a plurality of radiation sources may be switched on and off sequentially. As an alternative to a rotary motion, a region to be scanned may also be produced via sequentially ordered activation of a plurality of radiation sources. In this manner, for example, a region may be scanned without movable components. Since only a few radiation sources may be activated simultaneously, and consequently, beams of few radiation sources, reflected by objects, may be detected, the detector may be manufactured to be smaller. This allows the detector data recorded by the detector to be evaluated in a simplified and expedited manner, as well.

According to a further exemplary embodiment of the lidar device according to the present invention, in the lidar device, a plurality of radiation sources are positioned asymmetrically to each other along the axis of rotation. By positioning the radiation sources asymmetrically to each other, the radiation sources may be distributed with a greater distance of the radiation sources from each other. A corresponding image of the generated beams on the retina of an eye is spread out over a larger surface. Therefore, a danger to an eye may be reduced further. In addition, an asymmetric design of the radiation sources allows an intersection of the optical paths of the beams to be prevented, as well. In this connection, the radiation sources may be positioned on a rotor so as to be rotatable or stationary. As the number of radiation sources increases, the radiation sources along the axis of rotation may be advantageously constructed in the form of a plurality of columns of radiation sources, set apart from each other perpendicularly to the axis of rotation, one on top of the other vertically. An asymmetric design may be implemented, for example, by vertically staggering the columns of radiation sources with respect to each other.

According to a further aspect of the present invention, a method for scanning a region to be scanned with at least one beam, using a lidar device according to one aspect of the present invention, is provided. In one step, at least one beam is generated by at least one radiation source and emitted into the region to be scanned. At least one beam reflected by an object is received and detected by a detector; the at least one beam situated at a distance from an axis of symmetry being generated and emitted.

By appropriately orienting the at least one radiation source, or by using downstream generating optics, the at least one beam may be aligned in such a manner, that an optical path of the at least one beam does not intersect the axis of symmetry of the lidar device. In particular, in the case of a plurality of radiation sources, when eye safety is taken into account, this may prevent the sum of the transmission powers of the specific radiation sources from being decisive. Since the at least one beam travels parallelly to the axis of symmetry, there is no risk of intersection of a plurality of beams. This allows each radiation source to have a maximum transmission power. Therefore, it is not necessary to consider the sum of the transmission powers of the radiation sources. Through this, it is possible to increase a range of a lidar device without causing additional risk to human eyes.

According to one exemplary embodiment of the method, the at least one generated beam is swiveled about an axis of rotation and is emitted so as to be offset from the axis of rotation. The at least one generated beam is offset from the axis of rotation and has an optical path, which runs parallelly to the optical axis. The optical axis extends orthogonally from the axis of rotation and/or coincidently with the axis of symmetry in the direction of a region to be scanned. In this case, the optical axis and the axis of rotation have a point of intersection. By swiveling the rotor about the axis of rotation, a horizontal region to be scanned may be illuminated by the at least one generated beam. The axis of symmetry is swiveled or rotated together with the rotor, about the axis of rotation, and is oriented in accordance with a layout of the radiation sources. In particular, an axis of symmetry may be situated between a plurality of radiation sources, which may run in the beam direction, parallelly to an optical path of the generated beams.

According to a further exemplary embodiment of the method, the at least one generated beam travels parallelly to the axis of symmetry. This allows a so-called off-axis set-up to be implemented, which may prevent intersection of a plurality of generated beams and may consequently eliminate the danger of a plurality of concentrated beams, that is, beams focused onto a point of the retina.

In the following, preferred exemplary embodiments of the present invention are explained in greater detail in light of highly simplified, schematic representations.

BRIEF DESCRIPTION OF THE DRAWINGS

FIG. 5 shows a schematic functional sequence of a method according to a first exemplary embodiment.

DETAILED DESCRIPTION OF EXAMPLE EMBODIMENTS

Figure 1:
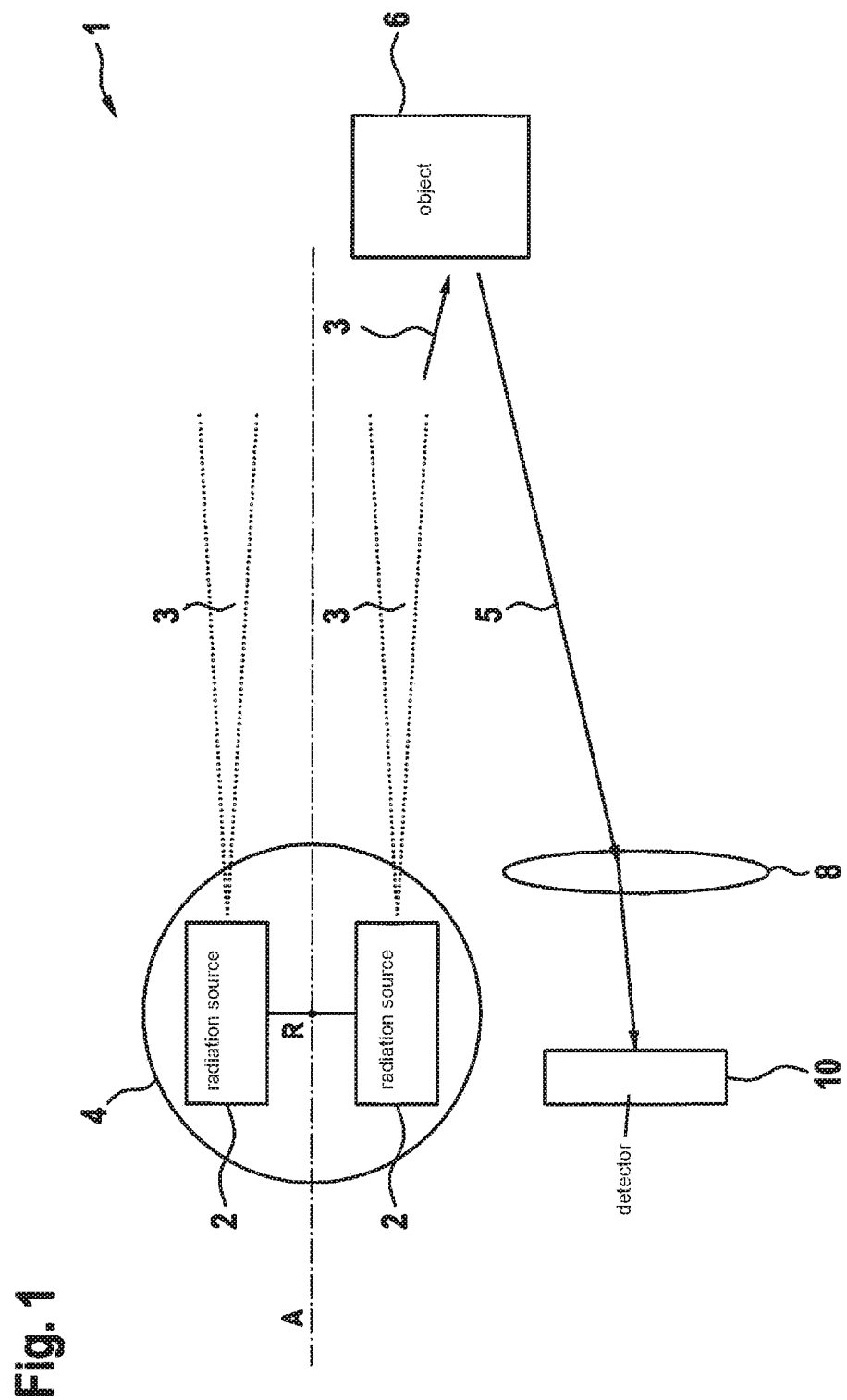
FIG. 1 shows a schematic representation of a lidar device according to a first exemplary embodiment.

In the figures, identical structural elements have, in each instance, the same reference numerals.

FIG. 1 shows a schematic representation of a lidar device 1 according to a first exemplary embodiment. Lidar device 1 includes two radiation sources 2. Radiation sources 2 are infrared lasers 2 and are used for generating beams 3. Beams 3 widen conically with increasing distance from lidar device 1. Radiation sources 2 are positioned on a rotor 4. Rotor 4 executes a rotating motion and, in this manner, also swivels the two radiation sources 2 spaced apart from each other, about an axis of rotation R of rotor 4. Consequently, the two radiation sources 2 may illuminate or scan a horizontal angular range, using generated beams 3. According to the exemplary embodiment, generated beams 3 travel parallelly to an axis of symmetry A of lidar device 1. Due to this, no points of intersection of beams 3 are formed, even at longer distances. Such points of intersection may constitute a potential risk for the human eye, since a plurality of beams 3, each having a high transmission power, may appear focused on a retina of the eye, within a limited area. Axis of symmetry A of lidar device 1 runs orthogonally from axis of rotation R in the direction of a region to be scanned.

If objects 6 are situated in the horizontal scanning angle and/or in the region to be scanned, the generated beams 3 may be scattered back or reflected by object 6 to lidar device 1. Object 6 may be, for example, an obstacle, a vehicle, a person or the like. Reflected beams 5 are formed by the reflection of generated beams 3 by object 5. In the figure, the optical path of generated beams 3 and of reflected beams 5 is used for clarifying the relationships and is represented in a highly simplified manner. Reflected beams 5 may be received by a receiving unit 8 and guided onto a detector 10. According to the exemplary embodiment, receiving unit 8 is an optical lens system. For the sake of simplicity, only a convex lens 8 is shown for receiving unit 8. Detector 10 may be, for example, a CMOS sensor or a photodiode array. Detector 10 records reflected beams 5 and converts reflected beams 5 to detector data, which may be evaluated subsequently.

Figure 2A:
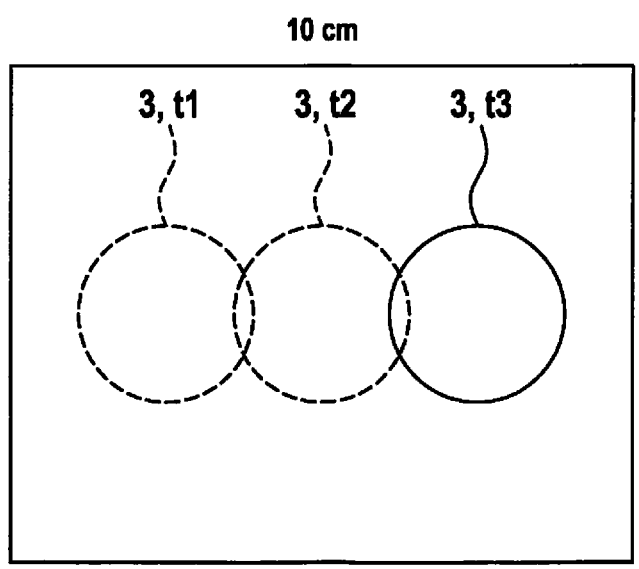
FIG. 2a, b show schematic representations of beams imaged on a retina.
Figure 2B:
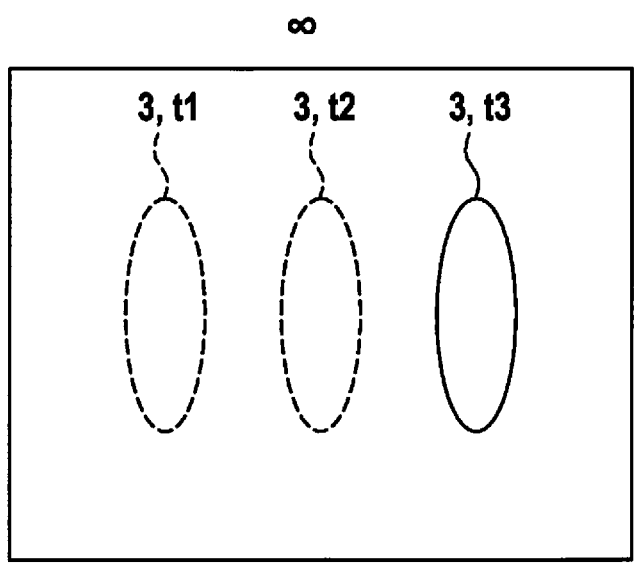

Accommodated images of generated beams 3 on a retina of an eye are shown in FIGS. 2a and 2b. They are the images of generated beams 3 at different times t1, t2, and t3. In this case, the time characteristic of generated beams on the retina is shown clearly. In particular, the time characteristic constitutes a portion of the swiveling motion of radiation sources 2 on rotor 4. At no time, do a plurality of generated beams 3 strike a region of the retina in unison. On the contrary, the generated beams 3 accommodated by the eye travel along the retina. FIG. 2a illustrates examples of images of generated beams 3 on the retina at different times t1, t2, t3, at a distance of 10 cm from the retina to radiation source 2. Examples of images of generated beams 3 on the retina, at an infinitely long distance from the retina to radiation source 2, are illustrated in FIG. 2b.

Figure 3:
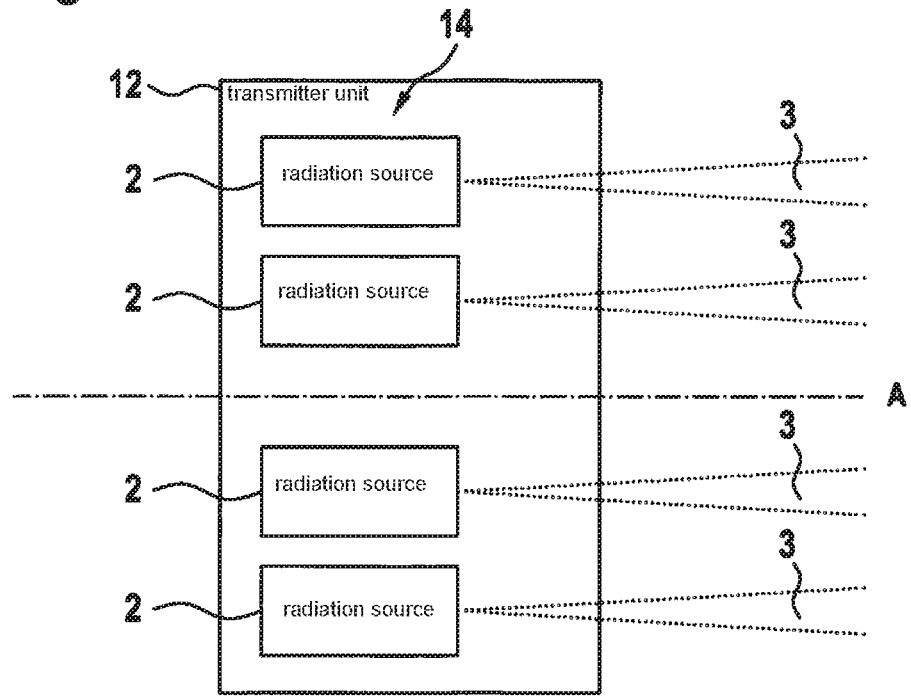
FIG. 3 shows a schematic plan view of a transmitter unit of a lidar device according to a second exemplary embodiment.

FIG. 3 shows a schematic plan view and/or a side view of a transmitter unit 12 of a lidar device 1 according to a second exemplary embodiment. In this case, transmitting unit 12 is constructed to be stationary. Consequently, such a lidar device 1 is a so-called flash lidar device 1, which renders a region to be scanned possible via sequential activation of radiation sources 2. According to the exemplary embodiment, radiation sources 2 are positioned so as to be spaced apart from each other along a vertical dimension of transmitter unit 12 and form a column-shaped group 14 of radiation sources.

Figure 4:
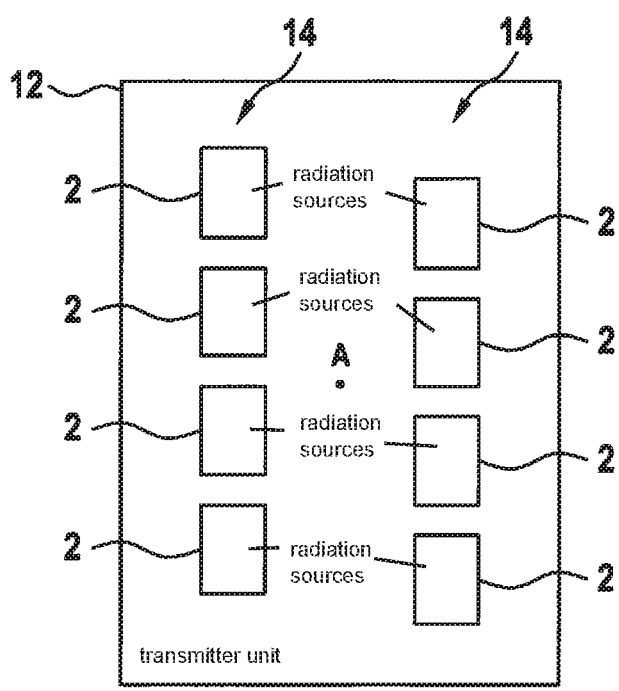
FIG. 4 shows a schematic front view of the transmitter unit of the lidar device according to the second exemplary embodiment.

A schematic front view of transmitter unit 12 of lidar device 1 according to the second exemplary embodiment from FIG. 3 is shown in FIG. 4. Here, it becomes clear, in particular, that transmitting unit 12 includes two columns of radiation sources 2 spaced apart from each other. Therefore, transmitter unit 12 includes two groups 14 of radiation sources, which are set apart from optical axis A and consequently form an off-axis system. The beams 3 generated by radiation sources 2 each have a beam path, which extends parallelly to optical axis A. Thus, generated beams 3 may not intersect optical axis A. This may prevent the different beams 3 generated from behaving as a virtual point source. In addition, the two groups 14 of radiation sources are positioned so as to be vertically offset from each other, which means that the specific radiation sources 2 have a greater separation from each other. An asymmetric layout of transmitter unit 12 is formed. Due to the asymmetric layout, generated beams 3 are at a further distance from each other. If the beams 3 generated in this manner are imaged in an eye, the individual beams may be imaged on the retina without overlap.

FIG. 5 shows a schematic functional sequence of a method 20 according to a first exemplary embodiment. In a first step, at least one beam 3 is generated 21 by the at least one radiation source 2 and emitted 22 into the region to be scanned. In this case, the at least one beam 3 is emitted 22 away from optical axis a, into the region to be scanned. Emitted beam 3 may be reflected 23 by an object. Reflected beam 5 is subsequently received 24 by a receiving unit 8 and guided onto detector 10. The measured detector data are then evaluated 25.

What is claimed is:

1. A lidar device for scanning a region to be scanned, using at least one beam, the device comprising:
   at least one radiation source configured to generate the at least one beam; and
   a receiving unit configured to receive at least one beam reflected by an object and to deflect the at least one reflected beam onto a detector;
   wherein the at least one radiation source is configured to generate the at least one beam away from an axis of symmetry, and the at least one beam travels at a distance from the axis of symmetry,
   wherein the at least one radiation source is situated on a rotor,
   wherein an axis of rotation of the rotor intersects the axis of symmetry of the lidar device at only a single point of the axis of symmetry.

2. The lidar device as recited in claim 1, wherein the at least one radiation source includes a plurality of radiation sources that are positioned in parallel to each other.

3. The lidar device as recited in claim 1, wherein the at least one radiation source is stationary-mounted.

4. The lidar device as recited in claim 1, wherein the at least one radiation source includes a plurality of radiation sources configured to be switched on and off sequentially.

5. The lidar device as recited in claim 1, wherein the at least one radiation source includes a plurality of radiation sources that are positioned asymmetrically to each other along the axis of rotation.

6. The lidar device as recited in claim 1, wherein the axis of symmetry is oriented orthogonally to the axis of rotation of the rotor.

7. A method for scanning a region to be scanned using at least one beam using a lidar device, the method comprising the following steps:
   generating at least one beam by at least one radiation source and emitting the generated at least one beam into the region to be scanned; and
   receiving and detecting at least one beam reflected by an object;
   wherein in the generating and emitting, the at least one beam is generated and emitted at a distance from an axis of symmetry,
   wherein the at least one radiation source is situated on a rotor, and
   wherein an axis of rotation of the rotor intersects the axis of symmetry of the lidar device at only a single point of the axis of symmetry.

8. The method as recited in claim 7, wherein the at least one generated beam is swiveled about an axis of rotation and is emitted so as to be offset from the axis of rotation.

9. The method as recited in claim 7, wherein the at least one generated beam runs parallelly to the axis symmetry.

10. The method as recited in claim 7, wherein the axis of symmetry is oriented orthogonally to the axis of rotation of the rotor.

\* \* \* \* \*